United States Patent [19]

Murayama

[11] Patent Number: 5,768,098
[45] Date of Patent: Jun. 16, 1998

[54] PORTABLE ELECTRONIC APPARATUS HAVING RECEPTACLE FOR DETACHABLY STORING CARD-TYPE ELECTRONIC COMPONENT

[75] Inventor: Tomomi Murayama, Tokyo, Japan

[73] Assignee: Kabushiki Kaisha Toshiba, Kawasaki, Japan

[21] Appl. No.: 806,195

[22] Filed: Feb. 26, 1997

[30] Foreign Application Priority Data

Feb. 27, 1996 [JP] Japan .................. 8-039655

[51] Int. Cl.⁶ .................. G06F 1/16; H05K 7/10
[52] U.S. Cl. .................. 361/684; 361/727; 361/730
[58] Field of Search .................. 364/708.1; 312/223.2; 361/683–686, 725–727, 730, 735, 737; 429/96–100

[56] References Cited

U.S. PATENT DOCUMENTS 4,206,274   6/1980   Peels .................. 429/99

5,677,827   10/1997   Yoshioka et al. .................. 361/683

FOREIGN PATENT DOCUMENTS 7-4661   2/1995   Japan .................. G06F 1/26

*Primary Examiner*—Michael W. Phillips
*Attorney, Agent, or Firm*—Limbach & Limbach, LLP

[57] ABSTRACT

A portable electronic apparatus has a housing body with a peripheral wall. The housing body includes a first receptacle having an opening portion opening to the peripheral wall. A battery pack is detachably mounted in the first receptacle. A second receptacle for detachably containing a memory card is formed within the housing body. The second receptacle has a slot for insertion and removable of the memory card. The slot is open to the first receptacle of the housing body and is covered by the battery pack mounted in the first receptacle.

21 Claims, 8 Drawing Sheets

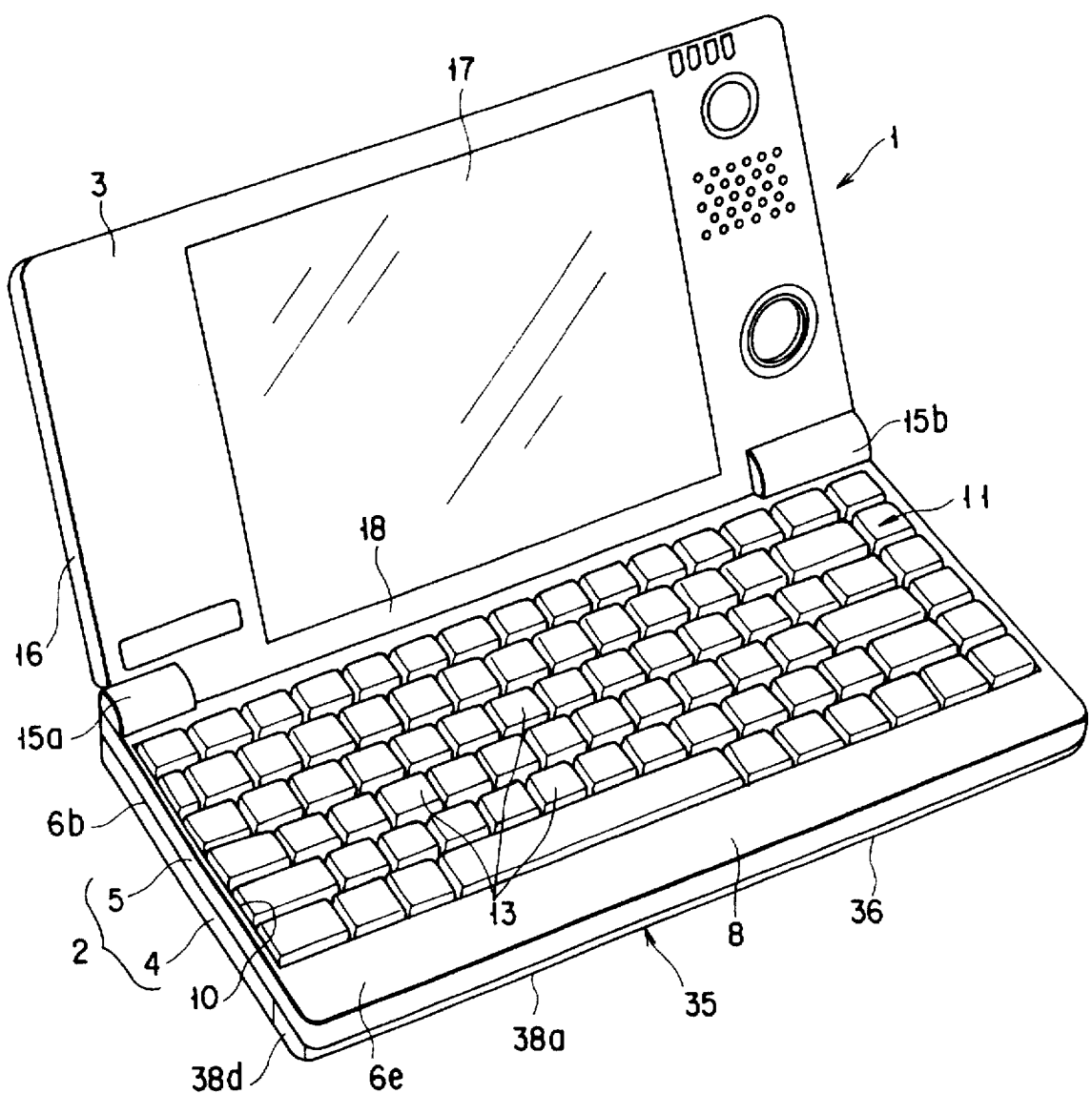
F I G. 1

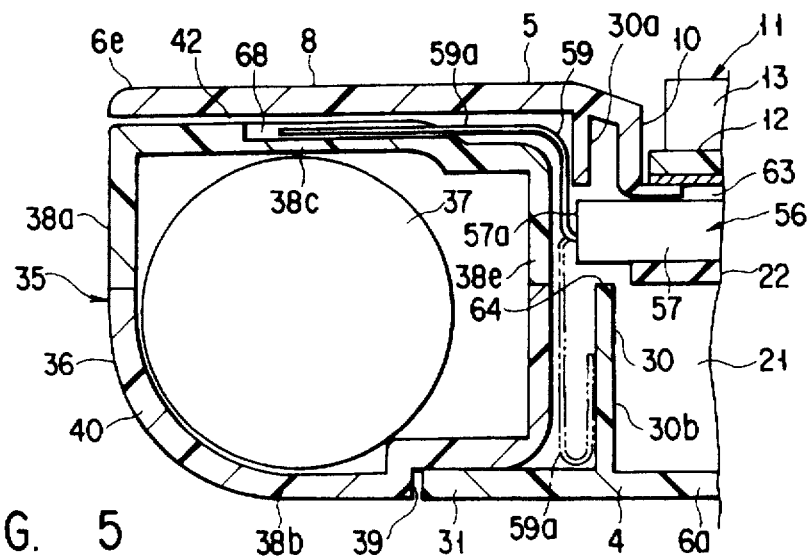
F I G. 5
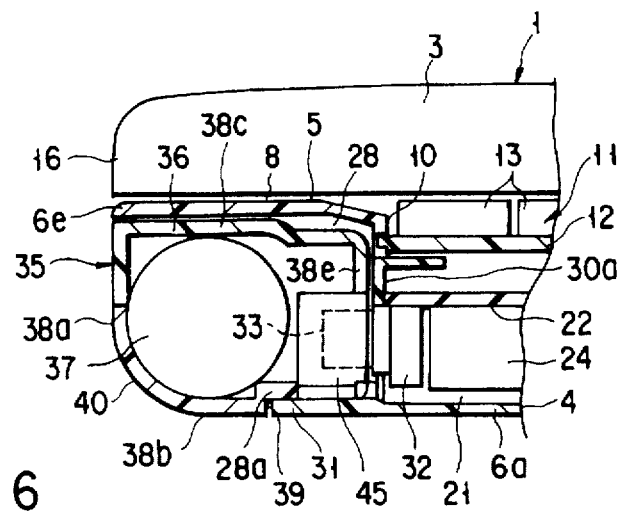
F I G. 6
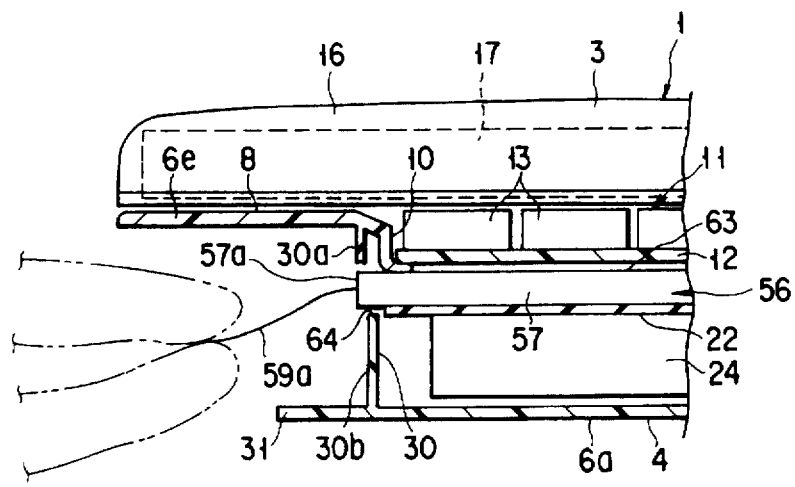
F I G. 7

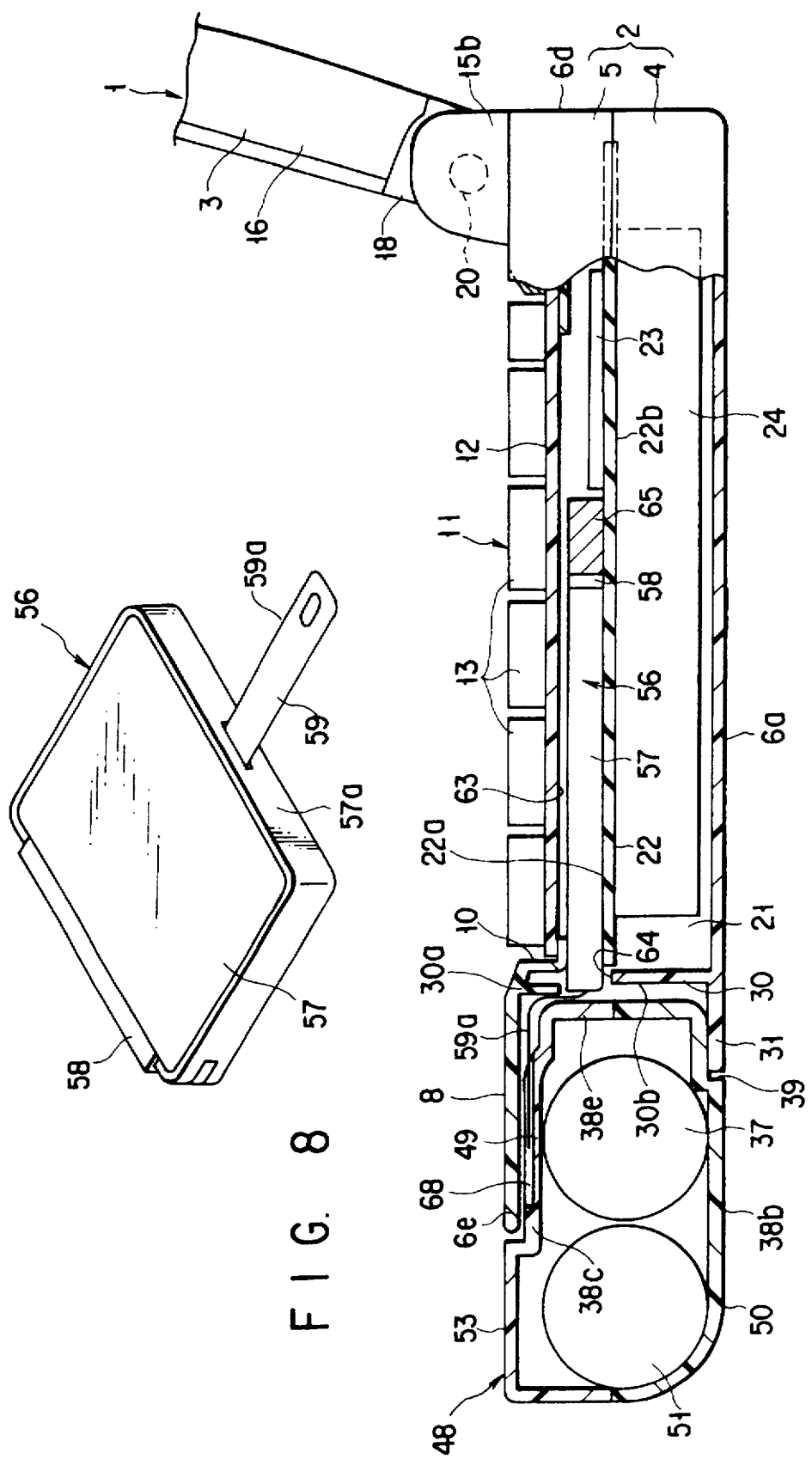

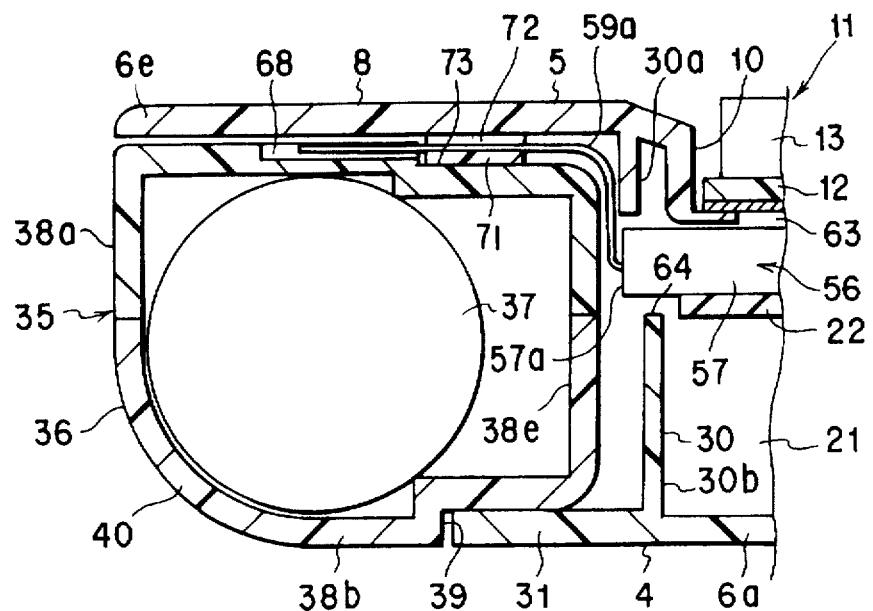
FIG. 10
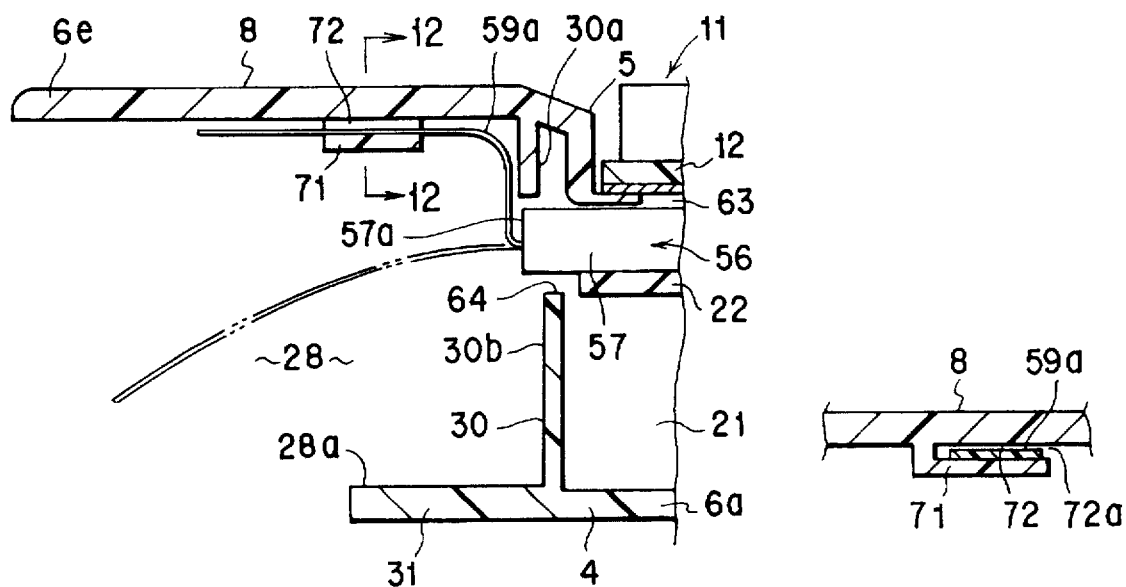
FIG. 11
FIG. 12

5,768,098

1

PORTABLE ELECTRONIC APPARATUS HAVING RECEPTACLE FOR DETACHABLY STORING CARD-TYPE ELECTRONIC COMPONENT

BACKGROUND OF THE INVENTION

The present invention relates to a portable electronic apparatus in which a card-type electronic component such as a memory card or an I/O card can be mounted.

There are known compact portable computers called book-type or notebook-type computers, in which memory cards can be loaded in order to increase storage capacities. The computer, which can be loaded with the memory card, has a box-shaped housing body with a card storage section. The memory card is detachably mounted in the card storage section of the housing body. The card storage section has a card slot for insertion of the memory card, and a card connector to which the memory card is detachably connected. In general, the card slot is provided on a side face or a front face of the housing body and is exposed to the outside of the housing body.

In the conventional portable computer, when the memory card is removed from the card storage section, the card slot is covered by a special cover or shutter. The cover or shutter serves to prevent entrance of dust or a foreign object. The cover or shutter is supported on the housing body removably or openably.

In the conventional computer, the special cover or shutter for covering the card slot needs to be provided even when the memory card is not needed. Thus, the number of parts increases due to the provision of the cover or shutter, resulting in a higher manufacturing cost of the computer.

In the case of the computer with the structure wherein the cover is removed when the memory card is inserted into the card slot, the removed cover must be kept in some other place. Consequently, the removed cover needs to be handled with proper care, or it may be lost.

In principle, the memory card needs to be loaded into or unloaded from the card storage section while the computer is switched off. If the card slot is exposed to the outside of the housing body, as mentioned above, the memory card may be loaded or unloaded while the computer is switched on. As a result, information on the memory card may be erased, or the computer may malfunction or fail.

BRIEF SUMMARY OF THE INVENTION

The present invention has been made in consideration of the above circumstances, and its object is to provide a portable electronic apparatus wherein a special cover or shutter for closing a slot is not required, the structure of a housing body is simplified, and erroneous insertion/removable of a card-type electronic component can be prevented.

In order to achieve the above object, there is provided a portable electronic apparatus comprising:

a housing body including a first receptacle having an opening portion;

a pack-like component detachably mounted in said first receptacle; and a second receptacle formed within said housing body and detachably containing a card-type electronic component, wherein said second receptacle has a slot for insertion and removal of said card-type electronic component, said

2 slot being open to said first receptacle, and when said pack-like component is mounted in said first receptacle, said slot is covered by the pack-like component.

According to this structure, the slot for insertion and removal of the card-type electronic component is covered by the pack-like component which is an indispensable structural element of the electronic apparatus. Thus, there is no need to provide a special cover or shutter for covering the slot. Accordingly, the number of parts of the electronic apparatus can be reduced. Moreover, a structure for supporting such a special cover or shutter need not be provided, and the structure of the housing body can be simplified.

Besides, when the card-type electronic component is inserted/removed in/from the second receptacle, the user is required to intentionally remove the pack-like component from the first receptacle and to expose the slot to the outside of housing body through the opening portion of the first receptacle. It is possible, therefore, to prevent the card-type electronic component from being erroneously pulled out of the second receptacle or inserted in the second receptacle.

In order to achieve the above object, there is also provided a portable electronic apparatus comprising:

a housing body including a first receptacle having an opening portion;

a pack-like component detachably mounted in said first receptacle;

a second receptacle formed within said housing body and having a card connector; and a card-type electronic component detachably contained in said second receptacle, said card-type electronic component having an eject element and a connector detachably connected to said card connector, wherein said second receptacle has a slot for insertion and removal of said card-type electronic component, said slot being open to said first receptacle and covered by the pack-like component contained in the first receptacle, and said eject element of the card-type electronic component is exposed to said first receptacle through said slot.

According to this structure, the slot for insertion and removal of the card-type electronic component is covered by the pack-like component which is an indispensable structural element of the electronic apparatus. Thus, there is no need to provide a special cover or shutter for covering the slot. Accordingly, the number of parts of the electronic apparatus can be reduced. Moreover, a structure for supporting such a special cover or shutter need not be provided, and the structure of the housing body can be simplified.

When the pack-like component is removed from the first receptacle, the eject element of the card-type electronic component is exposed to the outside of the housing body through the opening portion of the first receptacle. Thus, if the eject element is held by the fingers and pulled, the connector is disconnected from the card connector and the card-type electronic component can be taken out of the second receptacle through the slot. Accordingly, the card-type electronic component can be easily removed although the slot is open to the first receptacle.

In order to achieve the object, there is also provided an electronic apparatus system comprising:

an apparatus body including a first receptacle having an opening portion;

a second receptacle formed within said apparatus body adjacent to said first receptacle;

a first battery pack detachably mounted in said first receptacle and functioning as a driving power supply for the apparatus system;

a second battery pack to be replaced with the first battery pack and detachably mounted in the first receptacle as a substitute driving power supply for the apparatus system; and a card-type electronic component detachably contained in the second receptacle, wherein said second receptacle has a slot for insertion and removal of said card-type electronic component, said slot being open to said first receptacle, and when one of said first and second battery packs is mounted in said first receptacle, said slot is covered by said one of the first and second battery packs.

According to this structure, the slot for insertion and removal of the card-type electronic component is covered by the first or second battery pack which is an indispensable structural element of the electronic apparatus system. Thus, there is no need to provide a special cover or shutter for covering the slot. Accordingly, the number of parts of the electronic apparatus system can be reduced. Moreover, a structure for supporting such a special cover or shutter need not be provided, and the structure of the apparatus body can be simplified.

Besides, when the card-type electronic component is inserted/removed in/from the second receptacle, the user is required to intentionally remove the first or second battery pack from the first receptacle and to expose the slot to the outside of apparatus body through the opening portion of the first receptacle. It is possible, therefore, to prevent the card-type electronic component from being erroneously pulled out of the second receptacle or inserted in the second receptacle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view of a portable computer according to a first embodiment of the present invention;

FIG. 5 is a cross-sectional view of the housing body, showing the positional relationship between the battery pack and a card slot;

FIG. 6 is a cross-sectional view taken along line 6—6 in FIG. 2;

FIG. 7 is a cross-sectional view of the portable computer in the state in which the battery pack is removed from the battery storage section and a ribbon of a card-type electronic component is held by the fingers;

FIG. 8 is a perspective view of the card-type electronic component;

FIG. 9 is a cross-sectional view of the portable computer, showing the state in which an optional auxiliary battery pack is mounted in the battery storage section;

FIG. 10 is a cross-sectional view of a housing body according to a second embodiment of the invention, showing the positional relationship between a ribbon of a card-type electronic component and a battery pack;

FIG. 11 is a cross-sectional view of the housing body in the state in which the ribbon of the card-type electronic component is held within the battery storage section;

FIG. 12 is a cross-sectional view taken along line 12—12 in FIG. 11; and

DETAILED DESCRIPTION OF THE INVENTION

A first embodiment of the present invention, in which this invention is applied to a portable computer, will now be described with reference to FIGS. 1 to 9.

FIG. 1 shows a very small-sized portable computer 1 which can be stored, for example, in a pocket of a jacket. The computer 1 comprises a flat, box-shaped housing body 2 and a display unit 3 supported on the housing body 2.

Figure 3:
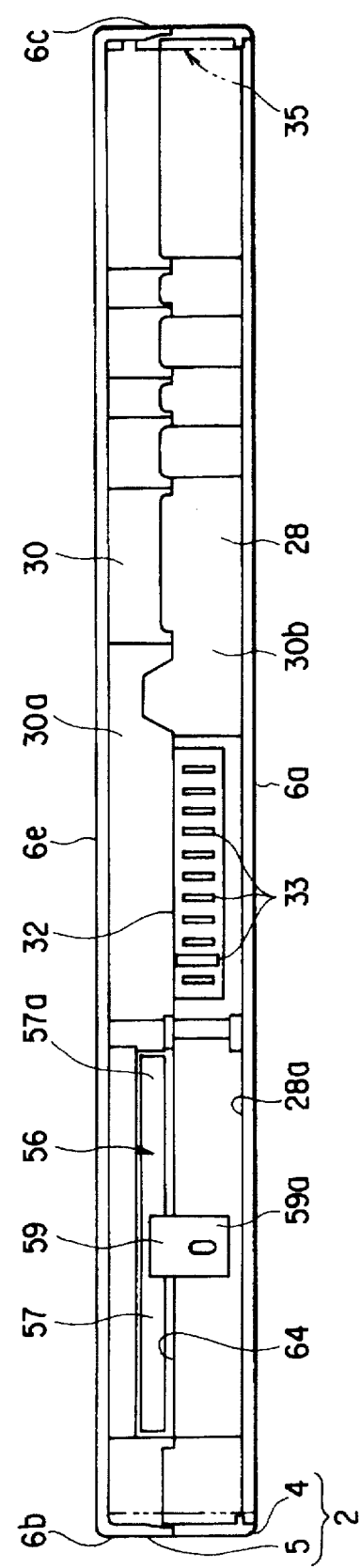
FIG. 3 is a front view of a housing body in the state in which a battery pack is removed from a battery storage section.
Figure 4:
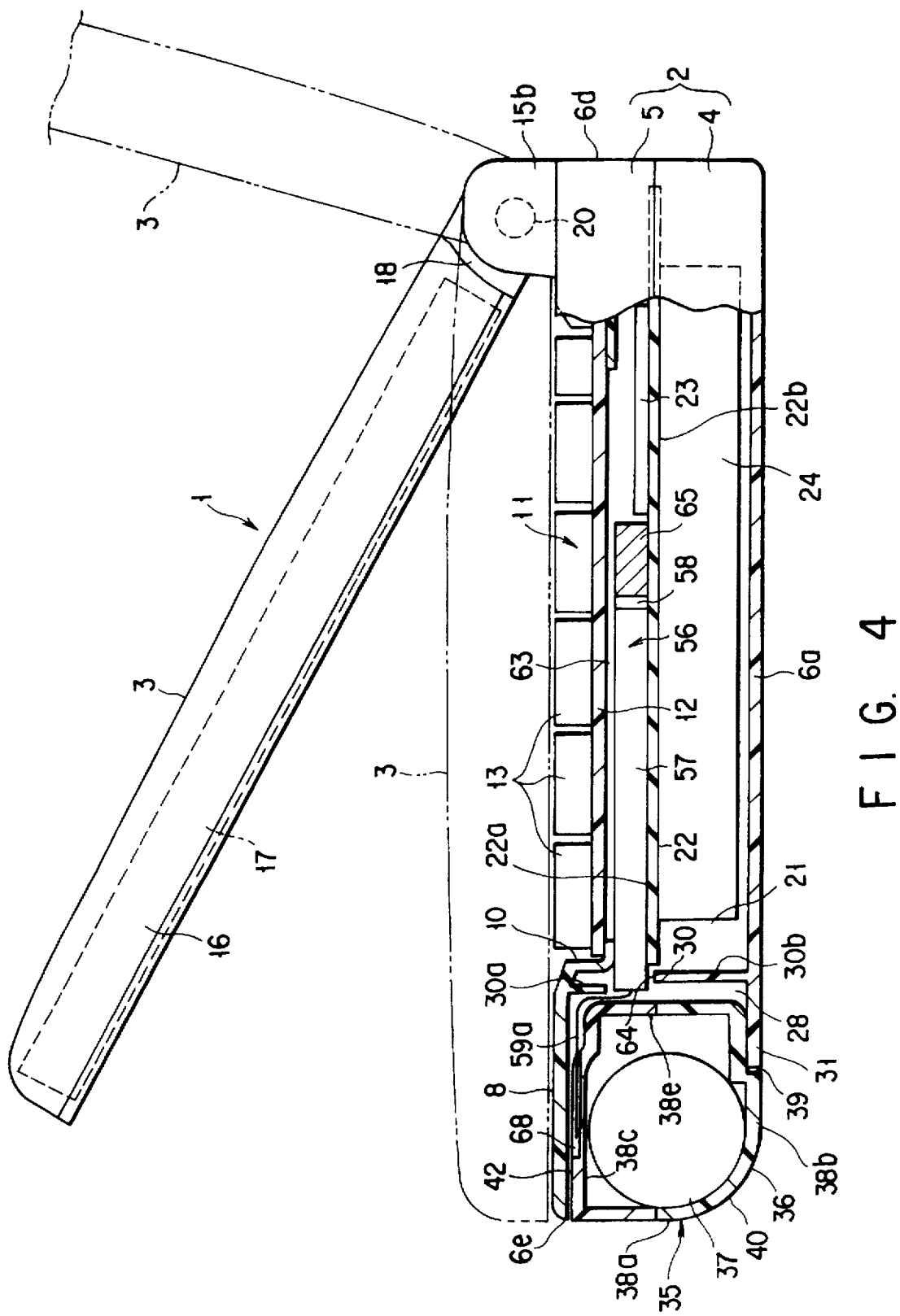
FIG. 4 is a cross-sectional view of the portable computer.

As is shown in FIGS. 3 and 4, the housing body 2 includes a lower housing 4 and an upper housing 5. The housings 4 and 5 are formed of a synthetic resin material such as ABS resin. The housing body 2 has a flat bottom wall 6a, a pair of side walls 6b and 6c continuous with the bottom wall 6a, a rear wall 6d and an upper wall 6e. The walls 6a to 6e constitute a peripheral wall of the housing body 2. The upper wall 6e is situated in parallel to the bottom wall 6a. A front portion of the upper wall 6e serves as an armrest 8. The armrest 8 extends in the width direction of the housing body 2.

The upper wall 6e of the housing body 2 includes a keyboard mount portion 10. The keyboard mount portion 10 is formed as a recess having a size covering substantially the entire area of the upper wall 6e excluding the armrest 8. A front end portion of the keyboard mount portion 10 is continuous with the armrest 8.

A keyboard 11 is mounted in the keyboard mount portion 10. The keyboard 11 includes a keyboard panel 12 formed of a synthetic resin, and a number of keys 13 disposed on the upper surface of the keyboard panel 12. The keyboard panel 12 has a rectangular plate-like shape with such a size as to be engaged in the keyboard mount portion 10. Front and rear edge portions of the keyboard panel 12 are detachably engaged in the keyboard mount portion 10.

A pair of display support portions 15a and 15b are disposed at a rear end portion of the upper wall 6e of housing body 2. The display support portions 15a and 15b are spaced apart from each other in the width direction of the housing body 2. The display unit 3 is supported on the display support portions 15a and 15b.

The display unit 3 comprises a flat, box-shaped housing 16 and a color liquid crystal display (LCD) 17 contained in the housing 16. An end portion of the housing 16 is provided with a connecting portion 18 extending in the width direction of the housing body 2. The connecting portion 18 is interposed between the display support portions 15a and 15b. The connecting portion 18 is supported on the housing body 2 by means of a hinge shaft 20. Accordingly, the display unit 3 is supported on the housing body 2 so as to be rotatable on the hinge shaft 20 between a closed position where the display unit 3 covers the armrest 8 and keyboard 11 and an open position where the armrest 8 and keyboard 11 are exposed.

As is shown in FIG. 4, the housing body 2 has a device storage chamber 21. The device storage chamber 21 is located below the keyboard 11. A circuit board 22 is stored in the device storage chamber 21. The circuit board 22 is situated in parallel to the bottom wall 6a of housing body 2. The circuit board 22 has an upper surface 22a opposed to the keyboard 11 and a lower surface 22b opposed to the bottom wall 6a. Various circuit elements 23 such as DRAMs are mounted on the upper and lower surfaces 22a and 22b of circuit board 22. A hard disk drive (HDD) 24 is attached to the lower surface 22b of circuit board 22. The HDD 24 is interposed between the circuit board 22 and bottom wall 6a of housing body 2.

The housing body 2 includes a battery storage section 28 as a first receptacle. The battery storage section 28 extends under the armrest 8 in the width direction of housing body 2. The battery storage section 28 is formed as a recess opening to the front side, bottom side, right side and left side of the housing body 2. Thus, the housing body 2 has at its front end portion an opening portion 28a extending over the entire width of the housing body 2.

The housing body 2 has a partition wall 30 between the battery storage section 28 and device storage chamber 21. The partition wall 30 comprises a first wall portion 30a extending downward from the armrest 8 and a second wall portion 30b extending upward from the bottom wall 6a of housing body 2. The partition wall 30 extends in the width direction of housing body 2. The bottom wall 6a of housing body 2 has a battery support wall 31 projecting forward from the position of the second wall portion 30b. The battery support wall 31 faces the armrest 8.

As is shown in FIGS. 4 and 7, the front end of the circuit board 22 is adjacent to the partition wall 30. A battery connector 32 is mounted on a central area of a front end portion of the lower surface 22b of circuit board 22. The battery connector 32 has comb-like contact portions 33. The contact portions 33 are arranged at intervals in the width direction of housing body 2. The contact portions 33 penetrate the partition wall 30 and project into the battery storage section 28.

A battery pack 35 is removably stored as a pack-like component in the battery storage section 28. The battery pack 35 serves as a driving power supply when the computer 1 is used in a place where commercial AC power is not available. The battery pack 35 includes a battery case 36 of a synthetic resin and a plurality of secondary batteries 37 contained within the battery case 36. The battery pack 35 is constructed as a module.

As is shown in FIGS. 4 to 6, the battery case 36 has a hollow cylindrical shape with such a size as to be fitted in the battery storage section 28. Secondary batteries 37 are coaxially arranged in the longitudinal direction of the battery case 36.

The battery case 36 has a front wall 38a, a bottom wall 38b, a top wall 38c, a pair of side walls 38d and a terminal end wall 38e. When the battery case 36 is mounted in the battery storage section 28, the front wall 38a closes the front opening of the battery storage section 28 and constitutes a front face of the housing body 2.

The bottom wall 38b is continuous with the front wall 38a. The bottom wall 38b closes the bottom opening of the battery storage section 28. Thus, the bottom wall 38b is continuous with the battery support wall 31 of housing body 2. An engaging recess portion 39 is formed at a rear portion of the bottom wall 38b. The engaging recess portion 39 is detachably placed on the upper surface of the battery support wall 31. A corner portion defined by the bottom wall 38b and front wall 38a forms an arcuated curved portion 40. The curved portion 40 is exposed to the front side of the housing body 2.

The top wall 38c faces the armrest 8. A small gap 42 is provided between the top wall 38c and armrest 8.

As is shown in FIG. 1, the side walls 38d are continuous with the front wall 38a. The side walls 38d close the side openings of the battery storage section 28. Accordingly, the side walls 38d are continuous with the side walls 6b and 6c of housing body 2.

The terminal end wall 38e faces the partition wall 30 of housing body 2. A connector 45 is disposed on a central portion of the terminal end wall 38e. The connector 45 is electrically connected to the secondary batteries 37. Thus, when the battery pack 35 is stored in the battery storage section 28 through the opening portion 28a, the contact portions 33 of battery connector 32 are engaged in the connector 45, thereby electrically connecting the battery pack 35 to the computer 1.

As is shown in FIG. 9, the computer 1 of this embodiment is optionally provided with an auxiliary battery pack 48. The auxiliary battery pack 48 is substituted for the battery pack 35 and stored in the battery storage section 28. The battery capacity of the auxiliary battery pack 48 is set to be greater than that of the battery pack 35. The auxiliary battery pack 48 includes a first case portion 49 to be fitted in the battery storage section 28, and a second case portion 50 continuous with the first case portion 49. Since the first case portion 49 has the same structure as the battery case 36, the common parts thereof are denoted by like reference numerals and a description there of is omitted.

The second case portion 50 has a hollow cylindrical shape, with a length spanning the entire width of the housing body 2. The second case portion 50 projects on the front side of the housing body 2. The second case portion 50 has an upper surface 53 continuous with the armrest 8. The upper surface 53 is substantially flush with the armrest 8. Accordingly, the second case portion 50 serves to expand the armrest 8. A plurality of secondary batteries 51 are housed in the second case portion 50. The secondary batteries 51 are coaxially arranged in the longitudinal direction of the second case portion 50. These secondary batteries 51 are connected to the connector 45. Thus, two rows of secondary batteries 37 and 51 are arranged within the auxiliary battery pack 48.

The housing body 2 of computer 1 includes a lock lever (not shown) for locking the battery pack 35 or auxiliary battery pack 48 in the battery storage section 28, and a power switch (not shown) electrically connected to the battery pack 35 or auxiliary battery pack 48.

A card-type electronic component 56 such as a memory card or an I/O card can be loaded in the computer 1. As is shown in FIG. 8, the card-type electronic component 56 has a flat plate-like shape. This electronic component 56 is a so-called half-size card having half the size of a common standardized card.

The card-type electronic component 56 has a card body 57 storing a circuit board (not shown). A connector 58 and an eject element 59 are supported on the card body 57. The connector 58 is disposed on one end portion of the card body 57 and extends in the width direction of the card body 57. The eject element 59 is fixed on the other end portion opposed to the connector 58. The eject element 59 has a film-like flexible ribbon 59a which is led out from an end face 57a of the card body 57.

Figure 2:
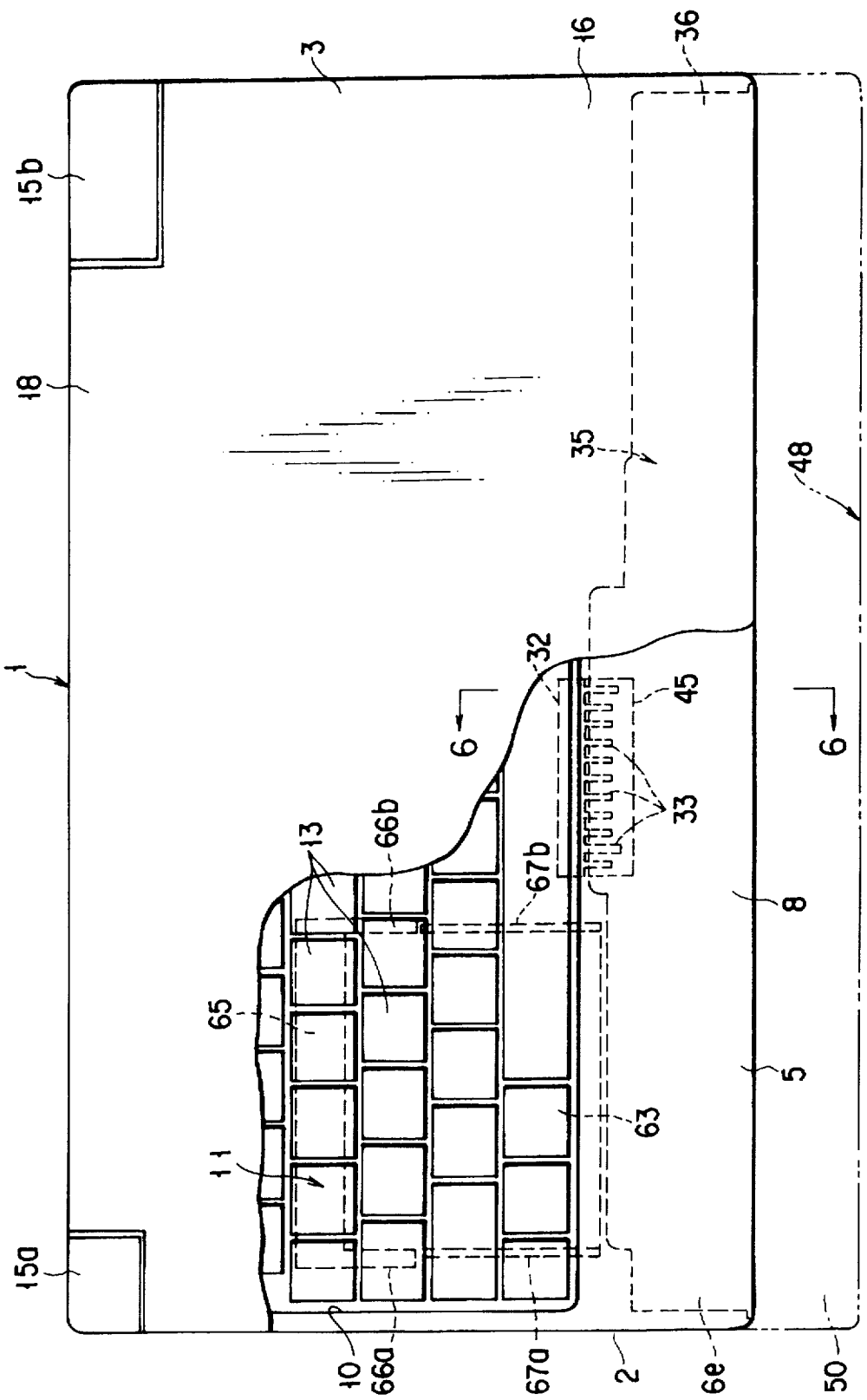
FIG. 2 is a plan view of the portable computer.

As is shown in FIGS. 2 and 4, a card storage section 63 or a second receptacle is formed within the housing body 2. In the card storage section 63, the card-type electronic component 56 is removably contained. The card storage section 63 is located between the upper surface 22a of circuit board 22 and the keyboard mount portion 10 and on the left side of the battery connector 32. The card storage section 63 and battery storage section 28 are arranged in the depth direction of the housing body 2. The partition wall 30 is interposed between the card storage section 63 and battery storage section 28.

The card storage section 63 has a card slot 64 for insertion/removal of the card-type electronic component 56, and a card connector 65. The card slot 64 is formed in the partition wall 30 of housing body 2, as shown in FIG. 3. The card slot 64 has an elongated shape extending in the width direction of housing body 2 and is open to the battery storage section 28. As is shown in FIGS. 4 and 9, in the state in which the battery pack 35 or auxiliary battery pack 48 is put in the battery storage section 28, the terminal end wall 38e of the battery pack 35 or auxiliary battery pack 48 is located just before the card slot 64. Accordingly, the card slot 64 is hidden by the battery pack 35 or auxiliary battery pack 48.

The card connector 65 is supported on the upper surface 22a of circuit board 22 and faces the card slot 64. As is shown in FIG. 2, the card connector 65 extends in the width direction of the housing body 2 and has first and second end portions spaced apart in the width direction of housing body 2. The first and second end portions of the card connector 65 are provided with insertion guides 66a and 66b, respectively. The insertion guides 66a and 66b extend in parallel from the first and second end portions of card connector 65 toward the card slot 64.

The keyboard mount portion 10 has a bottom surface facing the circuit board 22. A pair of guide walls 67a and 67b, as shown in FIG. 2, are formed on the bottom surface of the keyboard mount portion 10. The guide walls 67a and 67b extend in parallel in the depth direction of housing body 2 and are spaced apart in the width direction of housing body 2. The guide walls 67a and 67b bridge the card slot 64 and the insertion guides 66a and 66b. When the card-type electronic component 56 is inserted in the card slot 64, it will be guided to the card connector 65 by the guide walls 67a and 67b and insertion guides 66a and 66b. Accordingly, in the state in which the card-type electronic component 56 is stored in the card storage section 63, as shown in FIG. 4, the interface connector 58 of card body 57 is connected to the card connector 65, and the end face 57a of card body 57 having the ribbon 59a is located inside the card slot 64.

As is shown in FIG. 5, the ribbon 59a led out of the end face 57a of card body 57 is guided upward between the terminal end wall 38e of battery pack 35 and the partition wall 30 and then guided into the gap 42 defined between the top wall 38c of battery pack 35 and the armrest 8. The upper surface of the top wall 38c is provided with a groove-like recess portion 68. The recess portion 68 is exposed to the gap 42, and the ribbon 59a is led in the recess portion 68.

In the computer 1 having the above structure, the card-type electronic component 56 is stored in the card storage section 63 according to the following procedure.

First, the power switch of computer 1 is turned off. Then the battery pack 35 is unlocked and drawn from the battery storage section 28 in the forward direction of housing body 2. Thus, the battery storage section 28 is opened and the card slot 64 is exposed to the outside of housing body 2 through the opening portion 28a of battery storage section 28, as shown in FIGS. 3 and 7.

Subsequently, the card-type electronic component 56 is inserted into the card slot 64. The card-type electronic component 56 is guided to the card connector 65 by the guide walls 67a and 67b and insertion guides 66a and 66b, whereby the connector 58 of electronic component 56 is connected to the card connector 65. By this connection the card-type electronic component 56 has been loaded in the computer 1. At this time, the ribbon 59a of electronic component 56 is led out to the battery storage section 28 via the card slot 64. Since the ribbon 59a is a flexible film, it hangs from the card slot 64.

Once the card-type electronic component 56 has been loaded, the removed battery pack 35 is inserted once again into the battery storage section 28. In this case, the battery pack 35 inserted into the opening portion 28a of battery storage section 28 from the bottom side of the housing body 2, and the engaging recess portion 39 of bottom wall 38b of battery case 36 is hooked on the battery support wall 31. In addition, the ribbon 59a hanging from the card slot 64 is received by the top wall 38c of battery case 36 and the ribbon 59a is guided to the recess portion 68.

In this state, the battery case 36 is pushed into the battery storage section 28, and the opening portion 28a is closed by the front wall 38a, bottom wall 38b and side walls 38d of battery case 36. At last, the battery pack 35 is locked in the battery storage section 28 by means of the lock lever, and the card slot 64 and card-type electronic component 56 are hidden by the battery pack 35.

When the card-type electronic component 56 is taken out from the computer 1, the power switch of computer 1 is first turned off. Then the battery pack 35 is removed from the battery storage section 28. If the battery pack 35 is removed, the opening portion 28a of battery storage section 28 is uncovered and the card slot 64 and ribbon 59a of card-type electronic component 56 are exposed to the outside of the housing body 2 through the opening portion 28a.

In this state, the ribbon 59a is held by the fingers, as shown in FIG. 7, and pulled forward. Thereby, the connector 58 is disconnected from the card connector 65 so that the card-type electronic component 56 may be pulled out of the card slot 64. Accordingly, the card-type electronic component 56 can be easily removed although the card slot 64 is formed in the battery storage section 28.

According to the present invention, since the card slot 64 communicating with the card storage section 63 is opened in the battery storage section 28 of housing body 2, the card slot 64 can be hidden by the battery pack 35 or auxiliary battery pack 48 stored in the battery storage section 28. Thus, there is no need to provide a special cover or shutter for covering the card slot 64, or a dummy card, etc. for shutting up the card slot 64. Furthermore, there is no need to provide the housing body 2 with a structure for supporting a cover or a shutter. As a result, the manufacturing cost of the housing body 2 can be reduced and the price of the computer 1 lowered.

Since the battery pack 35 or auxiliary battery pack 48 is used as driving power supply for the computer 1, it is always contained in the battery storage section 28 during the use of computer 1. Accordingly, there is no concern that the battery pack 35 or auxiliary battery pack 48 might be lost, and the card slot 64 can surely be covered and hidden.

When the card-type electronic component 56 is loaded/unloaded in/from the card storage section 63, the user is required to intentionally remove the battery pack 35 or auxiliary battery pack 48 from the battery storage section 28 and to expose the card slot 64 to the outside of housing body 2. It is possible, therefore, to prevent the card-type electronic component 56 from being erroneously pulled out of the card storage section 63 or inserted in the card storage section 63.

In particular, when the card-type electronic component 56 is loaded/unloaded in/from the card storage section 63, the battery pack 35 is removed from the battery storage section 28. Thus, as long as the computer 1 is used with the battery pack 35 used as driving power supply, the driving power supply of computer 1 is turned off without fail once the battery pack 35 is removed. For example, when a memory card is loaded/unloaded in/from the card storage section 63, the driving power supply of computer 1 must be turned off. In such a case, it is possible to prevent the card-type electronic component 56 (i.e. memory card) from being erroneously loaded/unloaded while the driving power supply is turned on.

Accordingly, it is possible to prevent information stored in the card-type electronic component 56 from being erroneously erased or to prevent the computer 1 from malfunctioning. The operational reliability is enhanced during the loading/unloading of the card-type electronic component 56.

The eject element 59 used for removing the card-type electronic component 56 from the card storage section 63 comprises the flexible ribbon 59a. Accordingly, in the state in which the battery pack 35 or auxiliary battery pack 48 is contained in the battery storage section 28, the ribbon 59a is lifted by the battery case 36 of battery pack 35 or the first case portion 49 of auxiliary battery pack 48 and easily put between the top wall 38c and the lower surface of armrest 8. Therefore, the loading of the battery pack 35 or auxiliary battery pack 48 is not prevented by the presence of the ribbon 59a, and the mounting position of the battery pack 35 or auxiliary battery pack 48 does not become unstable.

When the battery pack 35 or auxiliary battery pack 48 has been mounted in the battery storage section 28, the ribbon 59a led out of the card slot 64 enters the recess portion 68 of the battery case 36 or first case portion 49 and is positioned in the gap 42. Thus, the ribbon 59a is not pressed between the battery storage section 28 and battery case 36 or first case portion 49. Therefore, damage to the ribbon 59a is prevented.

In the first embodiment, the ribbon 59a is guided to the gap 42 between the top wall 38c of battery case 36 and the armrest 8. In the present invention, however, the ribbon 59a led out of the card slot 64 may be bent downward and put between the terminal end wall 38e of battery case 36 and the partition wall 30, as indicated by a two-dot-and-dash line in FIG. 5.

The present invention is not limited to the above first embodiment. FIGS. 10 to 12 show a second embodiment of the invention. The second embodiment differs from the first embodiment with respect to a structure for positioning the ribbon 59a led out of the card slot 64. Both embodiments are the same in the other respects. In the second embodiment, the structural elements common to those in the first embodiment are denoted by like reference numerals and a description thereof is omitted.

As is shown in FIGS. 11 and 12, a hook 71 serving as a holding portion is integrally formed on the lower surface of the armrest 8. The hook 71 projects from the lower surface of armrest 8 into the battery storage section 28. The hook 71 defines a groove-like passage 72 between itself and the lower surface of armrest 8. The passage 72 has an open end 72a which opens to one end of the housing body 2 in the width direction of the housing body 2. The ribbon 59a is removably inserted into the passage 72 from the open end 72a. The ribbon 59a led out of the card slot 64 is inserted into the passage 72 and thus caught in the hook 71. The ribbon 59a is held in the battery storage section 28 such that it extends along the lower surface of the armrest 8.

The top wall 38c of battery case 36 has an escape recess portion 73 for preventing interference with the hook 71. The escape recess portion 73 is continuous with the recess portion 68 and is open continuously with a corner region defined by the top wall 38c and terminal end wall 38e. Accordingly, when the battery pack 35 is mounted in the battery storage section 28, the hook 71 enters the escape recess 73.

According to this structure, the ribbon 59a led out of the card slot 64 is held by the hook 71 such that it extends along the lower surface of armrest 8. Thus, the ribbon 59a is positioned at one location within the battery storage section 28.

When the battery pack 35 is mounted in the battery storage section 28, the ribbon 59a does not hang from the card slot 64. Thus, the ribbon 59a is not pressed between the battery pack 35 and battery storage section 28 and damage to the ribbon 59a can be prevented. Furthermore, when the battery pack 35 is removed from the battery storage section 28, the ribbon 59a cannot be caught on the battery pack 35. Thus, the ribbon 59a is not pulled while the battery pack 35 is being pulled, and unintentional removal of the card-type electronic component 56 can be prevented.

Besides, in the above structure, if the battery pack 35 is inserted into the battery storage section 28 in the reverse direction, an upper end portion of the front wall 38a of battery case 36 abuts upon the hook 71 and the battery pack 35 is prevented from further advancing into the battery storage section 28. Thus, the operator can recognize that the direction of insertion of the battery pack 35 is incorrect and the erroneous insertion of the battery pack 35 can be prevented.

Figure 13:
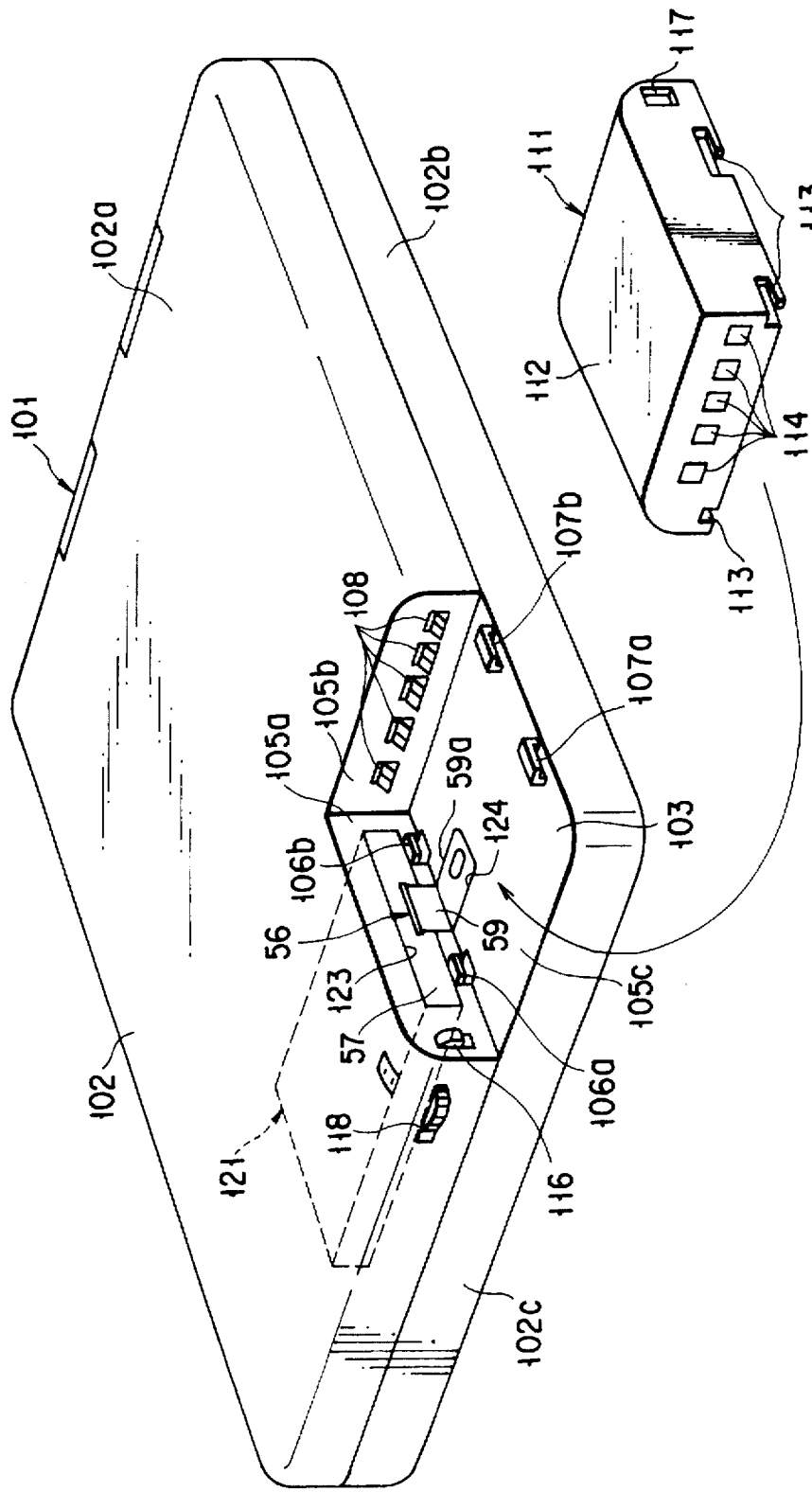
FIG. 13 is a perspective view of a portable computer according to a third embodiment of the invention.

FIG. 13 shows a third embodiment of the present invention.

FIG. 13 shows a portable computer 101 of a pen input type. The computer 101 has a flat rectangular box-like housing body 102. The housing body 102 includes a bottom wall 102a, a front wall 102b and a side wall 102c. A battery storage section 103 or a first receptacle is formed at one corner defined by these walls 102a to 102c.

The battery storage section 103 is constituted by a recess portion opening continuous with the bottom wall 102a, front wall 102b and side wall 102c. The battery storage section 103 has first and second support walls 105a and 105b extending upward from the bottom wall 102a of housing body 102, and a horizontal top wall 105c continuous with upper ends of the support walls 105a and 105b. The first support wall 105a extends in the width direction of housing body 102, and the second support wall 105b extends in the depth direction of the housing body 102.

A pair of first engaging projections 106a and 106b are disposed on an upper end portion of the first support wall 105a. A pair of second engaging projections 107a and 107b are disposed on a front end portion of the top wall 105c which is continuous with the front wall 102b. The first engaging projections 106a and 106b, as well as the second engaging projections 107a and 107b, are spaced apart in the width direction of housing body 102. A plurality of connection terminals 108 are disposed on the second support wall 105b. The connection terminals 108 are electrically connected to a circuit board (not shown) contained within the housing body 102.

A battery pack 111 or a pack-like component is removably mounted in the battery storage section 103. The battery pack 111 functions as a driving power supply when the computer 101 is used in a place where commercial AC power is not available. The battery pack 111 is packaged as one module. The battery pack 111 has a battery case 112 storing a plurality of secondary batteries (not shown). The battery case 112 has a shape corresponding substantially to the shape of the battery storage section 103.

The battery pack 111 is inserted/removed in/from the battery storage section 103 in a direction perpendicular to the side wall 102c of housing body 102. In the state in which the battery pack 111 is contained within the battery storage section 103, the outer peripheral surface of the battery case 112 is continuous with the bottom wall 102a, front wall 102b and side wall 102c of housing body 102.

The battery case 112 has a plurality of engaging recesses 113 and a plurality of contact portions 114 connected to the secondary batteries. When the battery pack 111 is mounted in the battery storage section 103, the engaging recesses 113 are detachably engaged with the first and second engaging projections 106a, 106b, 107a and 107b. Thus, the battery pack 111 is held in the battery storage section 103. If the battery pack 111 is mounted in the battery storage section 103, the contact portions 114 come into contact with the connection terminals 108 and thus the battery pack 111 is electrically connected to the computer 101.

A locking element 116 is disposed on the first support wall 105a of battery storage section 103. The locking element 116 is supported on the housing body 102 such that it can movable between a lock position in which the locking element 116 projects into the battery storage section 103 and an unlock position in which the locking element 116 retreats from the battery storage section 103 into the inside of the housing body 102. The locking element 116 is urged to the lock position at all times by means of a spring (not shown).

The battery case 112 of battery pack 111 has a recess portion 117 at a position corresponding to the locking element 116. When the battery pack 111 is mounted in the battery storage section 103, the locking element 116 engages the recess portion 117, thereby securing the engagement between the first and second engaging projections 106a, 106b, 107a and 107b and the engaging recesses 113. Thus, the battery pack 111 is held in the battery storage section 103.

The locking element 116 has an operation lever 118. The operation lever 118 is operated to shift the locking element 116 from the lock position to the unlock position. The operation lever 118 is exposed to the side wall 102c. If the locking element 116 is shifted from the lock position to the unlock position by the operation lever 118, the locking element 116 is disengaged from the recess portion 117 so that the battery pack 111 may be removed from the battery storage section 103.

A card storage section 121 or a second receptacle is formed within the housing body 102. The card storage section 121 has a card slot 123 for insertion/removal of the card-type electronic component 56, and a card connector (not shown) opposed to the card slot 123. The card slot 123 opens to the first support wall 105a of battery storage section 103.

In the state in which the card-type electronic component 56 is stored in the card storage section 121, the card slot 123 is shut up by the card body 57. Thus, the ribbon 59a of card body 57 is led out to the battery storage section 103. In the battery storage section 103, the ribbon 59a is bent so as to extend along the first support wall 105a and top wall 105c. The ribbon 59a and card slot 123 are hidden by the battery pack 111 mounted in the battery storage section 103.

In the present embodiment, a recess 124 for positioning the led-out portion of ribbon 59a is formed in the top wall 105c of battery storage section 103. The ribbon 59a is put in the recess 124.

In the computer 101 having the above structure, when the card-type electronic component 56 is to be loaded in the card storage section 121, the power switch of computer 101 is first turned off. Then the operation lever 118 is actuated to shift the locking element 116 from the lock position to the unlock position, thereby unlocking the battery pack 111. The battery pack 111 is pulled out in the lateral direction of the housing body 102. Thus, the battery storage section 103 is opened and the card slot 123 is exposed to the outside of the housing body 102.

Subsequently, the card-type electronic component 56 is inserted into the card slot 123, and the interface connector 58 is connected to the card connector of the card storage section 103. By this connection, the card-type electronic component 56 has completely been loaded in the computer 1. At this time, the ribbon 59a of electronic component 56 is led out of the card slot 123 into the battery storage section 103.

After the electronic component 56 has been loaded, the ribbon 59a is guided to the recess 123 and positioned in the battery storage section 103. Then the removed battery pack 111 is mounted once again in the battery storage section 103 and the battery pack 111 is locked in the battery storage section 103 by means of the locking element 116.

When the card-type electronic component 56 is to be unloaded from the card storage section 121, the power switch of computer 101 is first turned off. Then the operation lever 118 is actuated to unlock the battery pack 111, and the battery pack 111 is removed from the battery storage section 103. In this state, in the battery storage section 103, the card slot 123 and ribbon 59a are exposed to the outside of the housing body 102. The ribbon 59a is held by the fingers and pulled. Thereby, the connector 58 is disconnected from the card connector and the card-type electronic component 56 can be taken out of the card storage section 121.

In the computer 1 with the above structure, too, the card slot 123 for insertion/removal of the card-type electronic component 56 opens to the first support wall 105a of battery storage section 103 and accordingly the card slot 123 can be hidden by making use of the battery pack 111.

Thus, there is no need to provide a special cover or shutter for covering the card slot 123, or a dummy card, etc. for shutting up the card slot 123. Therefore, the same advantage as with the first embodiment can be obtained.

In the present invention, the pack-like component which covers the card slot is not limited to the battery pack. It may be, for example, a CD-ROM drive, a hard disk drive, or a floppy disk drive.

In the above embodiments, the eject element is attached to the card-type electronic component. This invention, however, is not limited to this mode. For example, the card storage section may be provided with a mechanical ejector having a pushing element for pushing out the card-type electronic component, and the battery storage section may be provided with an operation button for operating the ejector.

Furthermore, the size of the card-type electronic component is not limited to the half-size. This invention is similarly applicable to standardized full-size components such as PCMCIA cards or a communication-related cards.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A portable electronic apparatus comprising:

a housing body including a first receptacle having an opening portion;

a pack-like component detachably mounted in said first receptacle; and a second receptacle formed within said housing body and detachably containing a card-type electronic component, wherein said second receptacle has a slot for insertion and removal of said card-type electronic component, said slot being open to said first receptacle, and when said pack-like component is mounted in said first receptacle, said slot is covered by the pack-like component.

2. The portable electronic apparatus according to claim 1, wherein said pack-like component has a case which is designed to be continuous with a peripheral wall of the housing body when the pack-like component is mounted in the first receptacle, and said case closes the opening portion of the housing body.

3. The portable electronic apparatus according to claim 2, wherein said housing body has an upper wall continuous with said peripheral wall, said upper wall has a keyboard and an armrest continuous with a front end portion of the keyboard, and said first receptacle is situated below the armrest.

4. The portable electronic apparatus according to claim 3, wherein said first and second receptacles are arranged in the depth direction of the housing body.

5. The portable electronic apparatus according to claim 4, wherein said housing body has a partition wall interposed between the first and second receptacles, and said slot is formed in said partition wall.

6. The portable electronic apparatus according to claim 3, further comprising an auxiliary pack-like component which is to be mounted in said first receptacle as a substitute for said pack-like component, wherein said auxiliary pack-like component has a projecting portion projecting to the outside of the housing body from said opening portion, and said projecting portion has an upper surface continuous with said armrest.

7. The portable electronic apparatus according to claim 1, wherein said second receptacle has a card connector opposed to said slot, and said card-type electronic component has a connector to be connected to said card connector and an eject element to be used for removal of the card-type electronic component from the second receptacle, said eject element being exposed to the first receptacle through said slot.

8. The portable electronic apparatus according to claim 7, wherein said card connector has an insertion guide for guiding the card-type electronic component to said card connector when the card-type electronic component is inserted in the slot, and said housing body has a guide wall bridging said insertion guide and said slot.

9. The portable electronic apparatus according to claim 7, wherein said eject element has a flexible ribbon, said flexible ribbon being put between the first receptacle and the pack-like component in the state in which the pack-like component is mounted in the first receptacle.

10. The portable electronic apparatus according to claim 9, wherein said pack-like component has a recess portion in which said ribbon is to be put.

11. The portable electronic apparatus according to claim 9, wherein said first receptacle has a holder for detachably holding said ribbon.

12. The portable electronic apparatus according to claim 11, wherein said holder projects toward the pack-like component, and the pack-like component has an escape recess portion in which said holder is placed when the pack-like component is mounted in said first receptacle.

13. The portable electronic apparatus according to claim 1, wherein said card-type electronic component is a memory card which is to be detachably contained in said second receptacle in the state in which a driving power supply for the portable electronic apparatus is turned off, and said pack-like component is a battery pack functioning as the driving power supply for the portable electronic apparatus.

14. A portable electronic apparatus comprising:

a housing body including a first receptacle having an opening portion;

a pack-like component detachably mounted in said first receptacle;

a second receptacle formed within said housing body and having a card connector; and a card-type electronic component detachably contained in said second receptacle, said card-type electronic component having an eject element and a connector detachably connected to said card connector, wherein said second receptacle has a slot for insertion and removal of said card-type electronic component, said slot being open to said first receptacle and covered by the pack-like component contained in the first receptacle, and said eject element of the card-type electronic component is exposed to said first receptacle through said slot.

15. The portable electronic apparatus according to claim 14, wherein said eject element has a flexible ribbon, said flexible ribbon being put between the first receptacle and the pack-like component in the state in which the pack-like component is mounted in the first receptacle.

16. The portable electronic apparatus according to claim 15, wherein said pack-like component has a recess portion in which said ribbon is to be put.

17. The portable electronic apparatus according to claim 15, wherein said first receptacle has a holder for detachably holding said ribbon.

18. An electronic apparatus system comprising:

an apparatus body including a first receptacle having an opening portion;

a second receptacle formed within said apparatus body adjacent to said first receptacle;

a first battery pack detachably mounted in said first receptacle and functioning as a driving power supply for the apparatus system;

a second battery pack to be replaced with the first battery pack and detachably mounted in the first receptacle as a substitute driving power supply for the apparatus system; and a card-type electronic component detachably contained in the second receptacle.

wherein said second receptacle has a slot for insertion and removal of said card-type electronic component, said slot being open to said first receptacle, and when one of said first and second battery packs is mounted in said first receptacle, said slot is covered by said one of the first and second battery packs.

19. The electronic apparatus system according to claim 18, wherein said card-type electronic component has an eject element for removable of the card-type electronic component from the second receptacle, said eject element being exposed to the first receptacle through said slot.

20. The electronic apparatus system according to claim 18, wherein the battery capacity of the second battery pack is set to be greater than that of the first battery pack.

21. The electronic apparatus system according to claim 20, wherein said second battery pack has a projecting portion projecting to the outside of the apparatus body from said opening portion.

* * * * *